(12) United States Patent
Sawada

(10) Patent No.: US 8,854,483 B2
(45) Date of Patent: Oct. 7, 2014

(54) IMAGE PROCESSING DEVICE, IMAGE PROCESSING METHOD AND IMAGE PROCESSING PROGRAM

(75) Inventor: Yasuhiro Sawada, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 12/738,772

(22) PCT Filed: Oct. 15, 2008

(86) PCT No.: PCT/JP2008/068611
§ 371 (c)(1),
(2), (4) Date: Aug. 16, 2010

(87) PCT Pub. No.: WO2009/051121
PCT Pub. Date: Apr. 23, 2009

(65) Prior Publication Data
US 2010/0302384 A1 Dec. 2, 2010

(30) Foreign Application Priority Data

Oct. 19, 2007 (JP) ................................. 2007-272450

(51) Int. Cl.
*H04N 5/228* (2006.01)
*H04N 5/232* (2006.01)
*H04N 9/04* (2006.01)
*G06T 5/00* (2006.01)

(52) U.S. Cl.
CPC ...... *H04N 5/23248* (2013.01); *H04N 2209/046* (2013.01); *G06T 2207/10024* (2013.01); *H04N 9/045* (2013.01); *H04N 5/23267* (2013.01); *G06T 2207/20201* (2013.01); *G06T 5/003* (2013.01)
USPC ...................................... 348/208.4; 348/239

(58) Field of Classification Search
USPC ................. 348/208.4, 222.1, 223.1, 272, 280
See application file for complete search history.

(56) References Cited

U.S. PATENT DOCUMENTS 6,646,760 B1 * 11/2003 Hanihara ........................ 358/1.9
7,227,574 B2 * 6/2007 Yamanaka .................... 348/242
(Continued)

FOREIGN PATENT DOCUMENTS

| JP | 2001-320721 A | 11/2001 |
| JP | 2005-151158 A | 6/2005 |
| JP | 2006-157568 A | 6/2006 |

OTHER PUBLICATIONS

International Search Report dated Jan. 27, 2009 for PCT/JP2008/068611.

(Continued)

*Primary Examiner* — Tuan Ho
*Assistant Examiner* — Fayez Bhuiyan
(74) *Attorney, Agent, or Firm* — Leydig, Voit & Mayer, Ltd.

(57) ABSTRACT

The image processing device for generating a color image from a color mosaic image obtained with a single chip type imaging element includes: a camera motion detection module (40) which generates a motion correction value for motion between an object and an imaging element (5) from the pixel position of the color image; a sampling coordinate calculation unit (29) which sets sampling coordinates on the color mosaic image corresponding to the pixel position of the color image when the image is deformed; a sampling unit (32) which interpolates/generates a pixel value in the sampling coordinates from the pixel value of the same color light contained in the color plane for each of the planes decomposed by the color plane decomposition unit (21); and a color generation unit (33) which synthesizes the pixel values at the sampling coordinates of the respective color planes so as to generate a pixel signal of the color image.

15 Claims, 4 Drawing Sheets

(56) References Cited

U.S. PATENT DOCUMENTS

| | | |
|---|---|---|
| 7,952,614 B2 * | 5/2011 | Lee .......................... 348/208.99 |
| 2002/0167602 A1 * | 11/2002 | Nguyen ........................ 348/280 |
| 2004/0080639 A1 * | 4/2004 | Ishiga .......................... 348/272 |
| 2004/0150732 A1 | 8/2004 | Yamanaka |
| 2006/0114340 A1 * | 6/2006 | Sakurai et al. ................ 348/239 |
| 2007/0160355 A1 * | 7/2007 | Sasaki et al. .................... 396/55 |
| 2007/0171987 A1 * | 7/2007 | Trimeche ................. 375/240.27 |
| 2008/0246848 A1 * | 10/2008 | Tsubaki et al. ............ 348/208.4 |

OTHER PUBLICATIONS

Supplementary European Search Report for EP 08 83 9011 dated Nov. 18, 2010.

* cited by examiner

IMAGE PROCESSING DEVICE, IMAGE PROCESSING METHOD AND IMAGE PROCESSING PROGRAM

FIELD OF THE INVENTION

The present invention relates to an image processing device, an image processing method and an image processing program for processing an object image obtained in electronic form from an imaging unit. In particular therein a mosaic image is output by an image sensor having a single plate-type light filter that only has brightness information of a single color for every pixel. A color image having brightness information of a plurality of colors for every pixel is generated. The present invention further relates to the art of compensation of a relative motion between the imaging unit and a photographic subject.

BACKGROUND OF THE INVENTION

Conventionally, in the imaging system of a digital camera etc, an image of an object image is formed on an image sensor via a lens and photoelectric conversion of the object image is carried out with this image sensor. An image processing device and image processing method for generating an image signal are known as such.

A plurality of optoelectric transducers are arranged in a matrix form as a single chip-type image sensor. The front face of the sensor is equipped with R (red) G (green) and B (blue) light filters that match with the optoelectric transducers. The image processing device and image processing method apply signal processing to the single color image signals of the output image signal via this light filter to generate a color image.

Hence, the image output via the single chip-type image sensor, is a color mosaic image in which each pixel has only the color data of a single color. In order to generate a color image, it is necessary to provide for each pixel a plurality of color data, such as red (R) green (G) and blue (B).

For this reason, in image processing using a single chip type image sensor, so called demozaic processing (also called color interpolation processing) is performed for each pixel based on the color mosaic image which has the color data of any of the R, G, and B components. Here, demozaic processing is processing in which a color image is generated wherein each pixel has all the color data including the R, G, and B component. Therein color data lacking for a pixel is obtained by carrying out an interpolating calculation of other color data pixels in the pixel circumference (also called color interpolation processing).

For example, the light filter in a single chip type image sensor comprises a Bayer arrangement comprising three colors, R (red) G (green) B (blue) arranged in a matrix form so that in a unit of 4 pixels 1 pixel will result into an R image signal, 2 pixels result into a G image signal and 1 pixel results in a B image signal output via this image sensor. Then, the luminosity of two or more color components is calculated for every pixel from these signals. Methods are known as such wherein an image signal is formed by interpolation (See for example, patent document 1).

In mobile devices, such as a digital camera, when imaging a photographic subject, so called distortion of the image by an inadvertent motion of the digital camera or blur poses a problem. It is known as such to detect motion of a camera with a gyroscope or by digital signal processing of an image and to correct for motion and distortion. For example it is known to move the lens along the optic axis or to correct the pixel positions electronically (See for example patent documents 2).

Patent document 2 describes a correction of the pixel position by parallel translation. However, in order to obtain more nearly high-definition image quality, not only parallel translations but also roll and image deformation caused by yaw and pitch have to be compensated. Moreover it is necessary to have position correction at subpixel level. For position correction at subpixel level, in order to generate a pixel in the position which does not have the proper color information, it is necessary to interpolate the pixel value of the position demanded from a neighborhood pixel (See for example patent document 3).

Patent documents 1: JP,2004-534429,A
Patent documents 2: JP,2006-157568,A
Patent documents 3: JP,2000-298300,A

SUMMARY OF THE INVENTION

However, in the prior art color interpolation processing and interpolation processing for correction of motion distortion are performed independently and one color pixel is generated therein by the interpolation using two or more pixels. This entails a degradation of resolution, and results in a large processing load. Accordingly there is room for improvement especially taking into account the increase of resolution in recent years.

Hence, in said prior art generating a predetermined color image from the color mosaic image output by the single chip type image sensor provided with a light filter formed by a Bayer array with the three primary colors (RGB) requires correction of distortion after generating the lacking color component for every pixel by interpolation processing. Since interpolation processing is performed for correction of motion or distortion, the number of times of interpolation processing increases, resulting in a large interpolation processing load, and the possibility of deteriorating the image quality of the generated image.

According to the present invention a color image is generated from the color mosaic image obtained using the single chip type image sensor. It is a purpose of the present invention to provide a relatively simple image processing device, a image processing method, and image processing program which make it possible to apply color interpolation processing which generates two or more color data for every pixel, corrects motion distortion, etc. by down stream processing while preventing a deterioration of the resolution of the color image as much as possible.

In order to attain this purpose, the image processing device of the invention according to claim 1 wherein an image is obtained by an image sensor having two or more types of photodetectors for different colors is an image processing device which generates a color image having brightness information of a plurality of colors for each pixel using the obtained mosaic image having monochromatic brightness information for each pixel, which performs predetermined image transformations. The image processing device comprises a color plane decomposition module which disassembles said color mosaic image into two or more color planes each including only brightness information for a particular color. The image processing device further comprises a motion detecting module which generates a correction value for motion caused by a relative displacement between said photographic subject and said imaging unit for each pixel coordinate in said color mosaic image. The image processing device further comprises a sampling-coordinates calculation module which sets up sampling coordinates in said color mosaic image matched with a pixel position of said color image wherein the image deformation correction is performed for the pixel position of said color image using said motion correction value. The image processing device further comprises a sampling section which carries out calculation of the pixel value in said sampling coordinates by interpolation from a pixel value of the same colored light contained in said color plane for each of the two or more color planes decomposed by said color plane decomposition module. The image processing device further comprises a color generation module which composes a pixel value in sampling coordinates of each color plane in which interpolation was carried out by said sampling section, and generates a pixel signal of said color image.

The image processing device according to claim 1 performs a predetermined image deformation correction and generates a color image from the color mosaic image. The motion detecting module generates a correction value for motion caused by a relative displacement between a photographic subject and the imaging unit. The sampling-coordinates calculation module which sets up sampling coordinates in the color mosaic image that match with a pixel position of the color image for performing image deformation correction of a pixel position of the color image taking into account the motion correction value. The sampling section carries out an interpolation calculation of the pixel value in the sampling coordinates from pixel values of the same color contained in a color plane for each of the two or more color planes decomposed by the color plane decomposition module. The color generation module generates a pixel signal of the color image by composing a pixel value in sampling coordinates of each color plane for which the interpolation calculation was carried out by the sampling section. Accordingly, color interpolation processing for generating two or more color data for every pixel and image deformation correction for correcting motion are realizable by down stream processing while preventing a deterioration of the resolution of the color image as much as possible in a simple way.

Hence, since sampling coordinates are matched and set for color interpolation taking into account the required motion correction when generating a color image from a color mosaic image, image quality deterioration can be reduced and a color image with good resolution can be obtained as compared to the situation where the processes of color interpolation and image deformation correction are performed independently. Also these processes can be simplified.

In the embodiment of the image processing device of claim 1 further characterized by claim 2, said motion detecting element is arranged to generate a correction value for at least one of motion in a cross direction, motion in a longitudinal direction, motion in a sliding direction, rotation motion having the axis of rotation in a cross direction, rotation motion having the axis of rotation in a longitudinal direction, and rotation motion having the axis of rotation in a sliding direction toward a photographic subject. By being so arranged the sampling coordinates may correct for these kinds of motion, and a color image having a good resolution can be obtained by simple processing.

In the embodiment of the image processing device according to claim 1 or 2, further characterized by claim 3, said sampling-coordinates calculation module may set up said sampling coordinates when performing this image deformation using a parameter of said image deformation. Sampling coordinates are calculated taking into account the desired image deformation correction, and a color image having a good resolution can be obtained by a simple process.

In the embodiment of the image processing device according to any of claims 1 to claim 3 further characterized by claim 4 a parameter of said image deformation is a parameter indicative for at least one of parallel translation, scaling, roll, and yaw and pitch of an object image imaged to said image sensor. The sampling coordinates are calculated taking into account the image deformation. Therewith the desired image deformation correction can be performed in simple processing, and resolution and image quality can be improved.

In the embodiment of the image processing device according to any of claims 1 to claim 4 further characterized by claim 5 a parameter of said image deformation is indicative for a correction of an aberration. Therewith sampling coordinates are calculated taking into account both motion correction and correction of an aberration distortion. Therewith, in addition to the desired motion correction, correction of an aberration distortion can also be performed in simple processing, and resolution and image quality can be improved.

The image processing method according to claim 6, wherein an image is obtained with an imaging unit, having an image sensor which carries out photoelectric conversion for a plurality of colors, generates brightness information of a plurality of colors for each pixel using a color mosaic image which has monochromatic brightness information, performs predetermined image deformation and generates a color image.

The method comprises a color plane decomposition step which disassembles said color mosaic image into two or more color planes including only brightness information of the same colored light. The method comprises a motion detecting step which computes a correction value of relative motion of said photographic subject and said imaging unit for each pixel coordinate in said color mosaic image. The method comprises a sampling-coordinates calculation step which sets up sampling coordinates on said color mosaic image that match with a pixel position of said color image when performing said image deformation correction of a pixel position of said color image taking into account said motion correction value. The method comprises a sampling step which carries out interpolation formation of the pixel value in said sampling coordinates from a pixel value of the same colored light contained in said color plane for two or more color planes of every color image decomposed by said color plane decomposition module. The method comprises a color generation step which generates a pixel signal of said color image by composing the pixel value obtained in sampling coordinates from each color plane in which interpolation formation was carried out by said sampling step.

In the image processing method according to claim 6, the color plane decomposition step disassembles the color mosaic image into two or more color planes including only brightness information of the same colored light. The motion detecting step computes a correction value of relative motion of an object image and said image sensor for each pixel coordinate in the color mosaic image. The sampling-coordinates calculation step sets up sampling coordinates in the color mosaic image corresponding to a pixel position of the color image when performing image deformation correction of a pixel position of a color image taking into account the motion correction value. The sampling step carries out a calculation of the pixel value in the sampling coordinates by interpolation from a pixel value of the same colored light contained in a color plane for each of the two or more color planes decomposed by the color plane decomposition step. The color generation step generates a pixel signal of a color image by composing the pixel values in the sampling coordinates of each color plane for which interpolation formation was carried out by the sampling section. In this way color interpolation processing which generates two or more color data for every pixel image deformation correction for correction of motion, etc. are realizable in a simple way, analogously as described with reference to claim 1 by down stream processing while avoiding a deterioration of the resolution of the color image as much as possible.

In the image processing method according to claim 6 further characterized by claim 7, said motion detecting step comprises generating a correction value for at least one of motion in a sliding direction, motion in a cross direction, motion in a longitudinal direction, rotation motion having the axis of rotation in a cross direction, rotation motion having the axis of rotation in a longitudinal direction, and rotation motion having the axis of rotation in a sliding direction toward a photographic subject. Like the invention according to claim 2, in this way the calculated sampling coordinates can compensate these types of motion, therewith making it possible to obtain a color image having a good resolution by simple processing.

In the image processing method according to claim 6 or 7 further characterized by claim 8, said sampling-coordinates calculation step provides for a image deformation correction by takes into account a parameter of said image deformation. Like the invention according to claim 3, the sampling-coordinates are set up to provide for a compensation of image deformation. Therewith a color image having a good resolution can be obtained by simple processing.

In the image processing method according to claims 6 to 8, further characterized by claim 9, a parameter indicative for said image deformation is a parameter indicative for at least one of parallel translation, scaling, roll, and yaw and pitch of an object image imaged to said image sensor. Analogous to the invention according to claim 4, sampling coordinates are matched and set, taking into account such image deformation, and the desired image deformation correction can be performed by simple processing, while improving resolution and image quality.

In the image processing method according to claims 6 to 9 further characterized by claim 10 a parameter indicative for said image deformation is indicative for an aberration distortion resulting from an imaging unit. As in the invention according to claim 5, therewith sampling coordinates are calculated taking into account both motion correction and correction of an aberration distortion. Therewith, in addition to the desired motion correction, correction of an aberration distortion can also be performed in simple processing, and resolution and image quality can be improved.

An image processing program according to claim 11 to be performed on a computer, wherein an image is obtained with an imaging unit, having an image sensor which carries out photoelectric conversion for a plurality of colors, which causes the computer to execute so that a color image is generated having brightness information of a plurality of colors for each pixel, while a predetermined image deformation correction is performed comprises the following steps. The program comprises a color plane decomposition step which disassembles said color mosaic image into two or more color planes including only brightness information of the same colored light. The program comprises a motion detecting step which computes a correction value of relative motion of said photographic subject and said imaging unit for each pixel coordinate in said color mosaic image. The program comprises a sampling-coordinates calculation step which sets up sampling coordinates on said color mosaic image that match with a pixel position of said color image when performing said image deformation correction of a pixel position of said color image taking into account said motion correction value. The program comprises a sampling step which calculates the pixel value in said sampling coordinates by interpolation from pixel values of the same colored light contained in said color plane for each of two or more color planes decomposed by said color plane decomposition module. The program comprises a color generation step which generates a pixel signal of said color image by composing the pixel value obtained in sampling coordinates from each color plane in which interpolation formation was carried out by said sampling section.

According to the image processing program according to claim 11 the color plane decomposition step disassembles the color mosaic image into two or more color planes including only brightness information of the same colored light. The motion detecting step computes a correction value of relative motion of an object image and said image sensor to each pixel coordinate in the color mosaic image. The sampling-coordinates calculation step sets up sampling coordinates in the color mosaic image corresponding to a pixel position of the color image when performing image deformation correction of a pixel position of a color image taking into account the motion correction value. The sampling step carries out a calculation of the pixel value in the sampling coordinates by interpolation from a pixel value of the same colored light contained in a color plane for each of the two or more color planes decomposed by the color plane decomposition step. The color generation step generates a pixel signal of a color image by composing the pixel values in the sampling coordinates of each color plane for which interpolation formation was carried out by the sampling section. In this way color interpolation processing which generates two or more color data for every pixel image deformation correction for correction of motion, etc. are realizable in a simple way, by down stream processing while avoiding a deterioration of the resolution of the color image as much as possible, analogously as described with reference to claim 1.

In the embodiment of the image processing program according to claim 11, further characterized by claim 12 said motion detecting step comprises generating a correction value for at least one of motion in motion in a sliding direction, motion in a cross direction, motion in a longitudinal direction, rotation motion having the axis of rotation in a cross direction, rotation motion having the axis of rotation in a longitudinal direction, and rotation motion having the axis of rotation in a sliding direction toward a photographic subject. Like the invention according to claim 2, by having a computer perform said program the calculated sampling coordinates can compensate these types of motion, therewith making it possible to obtain a color image having a good resolution is good by simple processing.

In the image processing program according to claim 11 or 12, further characterized by claim 13 said sampling-coordinates calculation step provides for a image deformation correction by takes into account a parameter of said image deformation. Like the invention according to claim 3, by having the computer perform said step the sampling-coordinates are set up to provide for a compensation of image deformation. Therewith a color image having a good resolution can be obtained by simple processing.

In the image processing program according to claims 11 to 13, further characterized by claim 14 a parameter indicative for said image deformation is a parameter indicative for at least one of parallel translation, scaling, roll, yaw and pitch of an object image imaged to said image sensor. Analogous to the invention according to claim 4, sampling coordinates are matched and set taking into account such image deformation, and the desired image deformation correction can be performed by simple processing, while improving resolution and image quality.

In the image processing program according to claims 11 to 14, further characterized by claim 15 a parameter indicative for said image deformation is indicative for an aberration distortion resulting from an imaging unit. As in the invention according to claim 5, therewith sampling coordinates are calculated taking into account both motion correction and correction of an aberration distortion. Therewith, in addition to the desired motion correction, correction of an aberration distortion can also be performed in simple processing, and resolution and image quality can be improved.

The image processing device, the image processing method, and the image processing program, of the present invention perform a predetermined image deformation correction and generates a color image from the color mosaic image. The color mosaic image is disassembled into two or more color planes including only brightness information of the same colored light. A correction value for each pixel coordinate in the color mosaic image is generated for motion caused by a relative displacement between a photographic subject and the imaging unit. Sampling coordinates in the color mosaic image that match with a pixel position of the color image are set up for performing image deformation correction of a pixel position of the color image taking into account the motion correction value. A pixel value is calculated in the sampling coordinates by interpolation from pixel values for the same color contained in a color plane for each of the two or more color planes decomposed by the color plane decomposition module. A pixel signal of the color image is obtained by composing a pixel value in sampling coordinates of each color plane for which the interpolation calculation was carried out by the sampling section.

Accordingly, color interpolation processing for generating two or more color data for every pixel and image deformation correction for correcting motion are realizable by relatively simple processing while preventing a deterioration of the resolution of the color image as much as possible.

Accordingly, since in the image processing device, the image processing method, and the image processing program of this invention the sampling coordinates are set up in consideration of both color interpolation and motion correction when generating a color image from the color mosaic image, image quality deterioration can be reduced, and a color image with a good resolution can be obtained as compared to the situation wherein color interpolation processing, image deformation correction and the like are performed independently. In addition these processes can be simplified.

In an embodiment of the image processing device, the image processing method, and the image processing program of this invention said motion detecting step comprises generating a correction value for at least one of motion in a sliding direction, motion in a cross direction, motion in a longitudinal direction, rotation motion having the axis of rotation in a cross direction (roll), rotation motion having the axis of rotation in a longitudinal direction (pitch), and rotation motion having the axis of rotation in a sliding direction (yaw) toward a photographic subject. Therewith the calculated sampling coordinates can compensate these types of motion, therewith making it possible to obtain a color image having a good resolution by simple processing.

By generating the sampling coordinates at the time of performing the image deformation correction using a parameter indicative of the image deformation, in an embodiment of the image processing device, the image processing method, and the image processing program of this invention sampling coordinates are matched according to the desired image deformation correction. Therewith a color image having a good resolution can be obtained by simple processing.

In an embodiment of the image processing device, the image processing method, and the image processing program, according to this invention the parameter indicative for an image deformation is a parameter indicative for at least one of a parallel translation, scaling, roll, yaw and pitch of the object image formed at said image sensor. Therewith sampling coordinates are matched according to the desired image deformation correction. Therewith the desired image deformation correction can be performed in a simple process, and the resolution and image quality can be improved.

In an embodiment of the image processing device, the image processing method, and the image processing program of the invention the parameter of image deformation is also indicative for a correction of the aberration distortion resulting from an imaging unit, (I.e. an aberration distortion resulting from the imaging lens incorporated in the imaging unit). Therein sampling coordinates are matched considering the three requirements of color interpolation, motion correction, and correction of an aberration distortion. Therewith, in addition to the desired image deformation correction, correction of an aberration distortion can also be performed in simple processing, and resolution and image quality can be improved.

BRIEF DESCRIPTION OF THE FIGURES

FIG. 2f illustrates an interpolation calculation of the pixel value in sampling coordinates;

| | Symbols explanation |
|---|---|
| 1 | An imaging device, |
| 2 | An imaging unit, |
| 3 | An imaging lens, |
| 5 | Image sensor, |
| 5a | The light filter of a Bayer array, |
| 6 | AFE (Analog Front End), |
| 7 | A correlation double sampling circuit, |
| 8 | Variable gain amplifier (AGC: Automatic Gain Control), |
| 9 | An A/D converter, |
| 10 | A detecting element, |
| 11 | A sensor, |
| 12 | Lens actuator, |
| 13 | TG (Timing Generator), |
| 15 | Angular velocity sensor, |
| 18 | CPU (Central Processing Unit), |
| 19 | ROM (Read Only Memory), |
| 21 | Color plane decomposition module, |
| 22 | R field memory, |
| 23 a | Gr field memory, |
| 23 b | Gb field memory, |
| 24 | B field memory, |

-continued

Symbols explanation

| | |
|---|---|
| 25 | An output image scanning section, |
| 29 | Sampling-coordinates calculation module, |
| 32 | A sampling section, |
| 33 | A color generation module, |
| 34 | A vision correction module, |
| 35 | A compression module, |
| 36 | The Storage unit, |
| 37 | A lens state detecting element, |
| 38 | An aberration coefficient table, |
| 39 | An aberration coefficient calculation module, |
| 40 | The motion detecting module, |
| 100 | Image processing device. |

DETAILED DESCRIPTION OF THE DRAWINGS

Next, one example of an image processing device, an image processing method, and an image processing program according to the invention is described with reference to the drawings.

Figure 1:
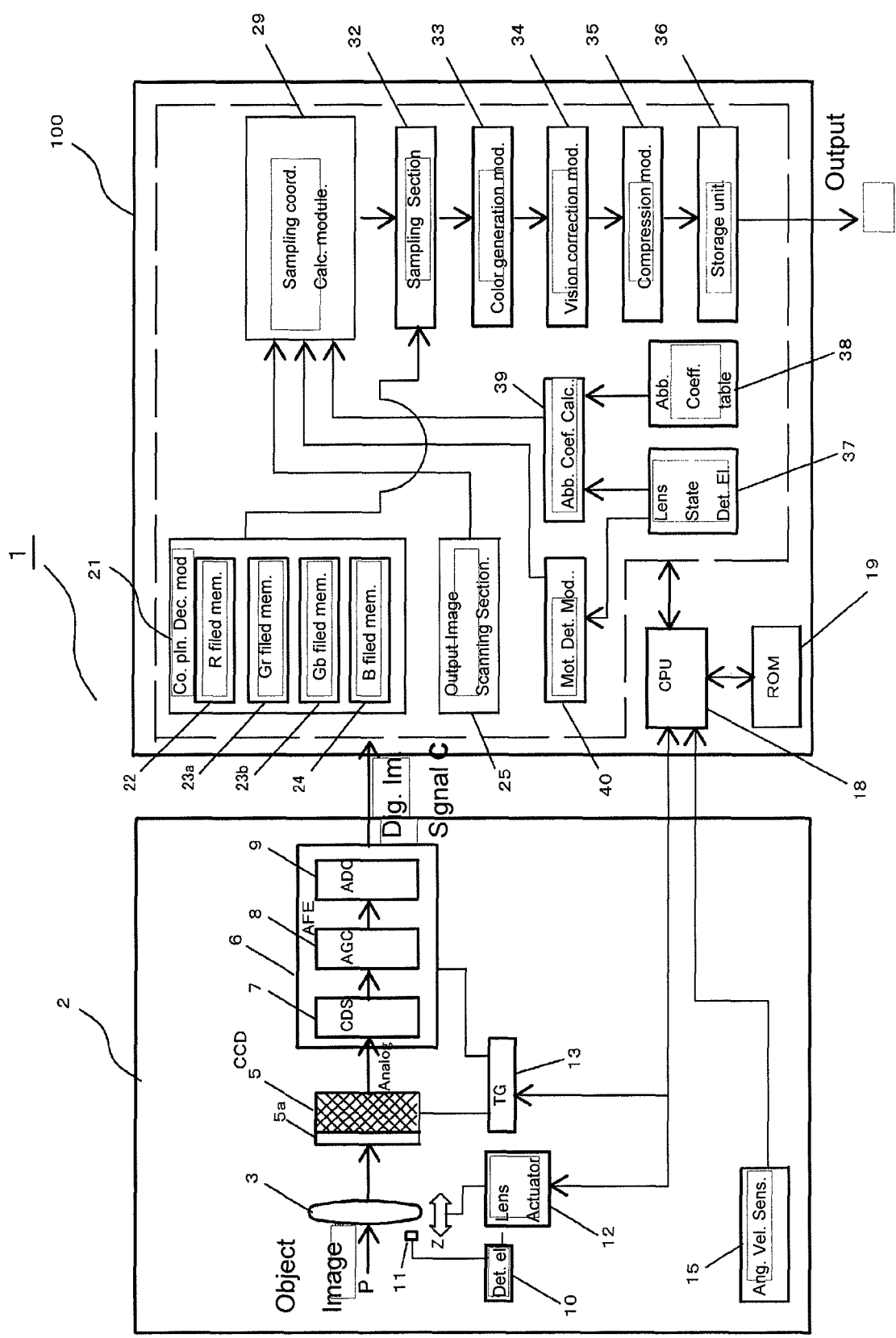
FIG. 1 shows in a block diagram the composition of the imaging device 1 according to one embodiment in which the image processing device of this invention and the image processing method, and the image processing program were applied.
Figure 2:
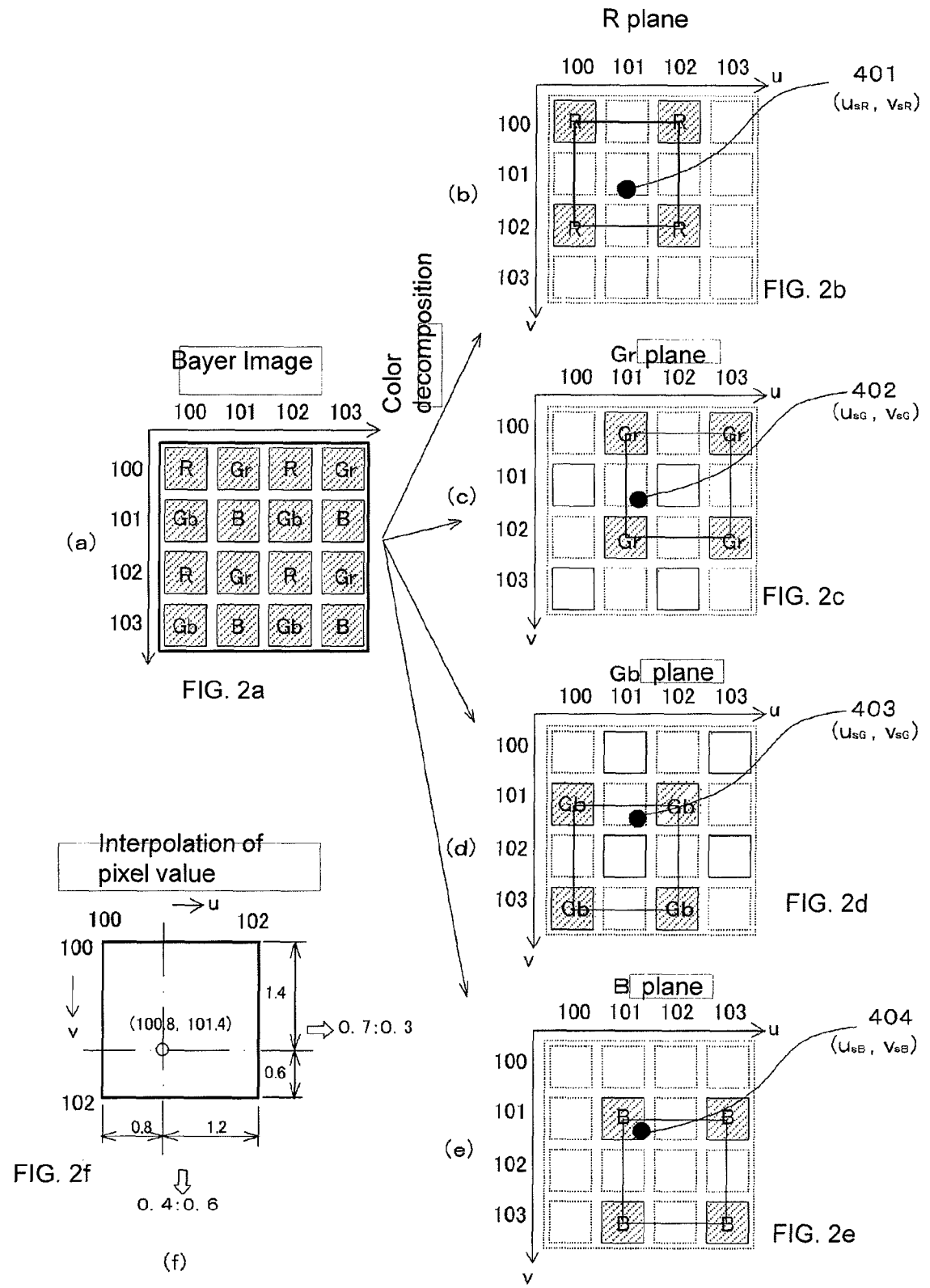
FIG. 2 is a functional illustration of a color plane decomposition module and a color generation module in said embodiment. Therein FIG. 2a the color mosaic image of the Bayer array output by the imaging unit 2, and FIGS. 2b, 2c, 2d, and 2e respectively show the R plane, Gr plane, Gb plane and B plane generated by the color plane decomposition module.

FIG. 1 shows in a block diagram the composition of the imaging device 1 according to one embodiment in which the image processing device of this invention and the image processing method, and the image processing program were applied. FIG. 2 is a functional illustration of a color plane decomposition module and a color generation module in said embodiment, Therein FIG. 2a shows the color mosaic image of the Bayer array output by the imaging unit 2, and FIGS. 2b, 2c, 2d, and 2e respectively show the R plane, Gr plane, Gb plan and B plane generated by the color plane decomposition module and FIG. 2f illustrates an interpolation calculation of the pixel value in sampling coordinates.

Figure 3:
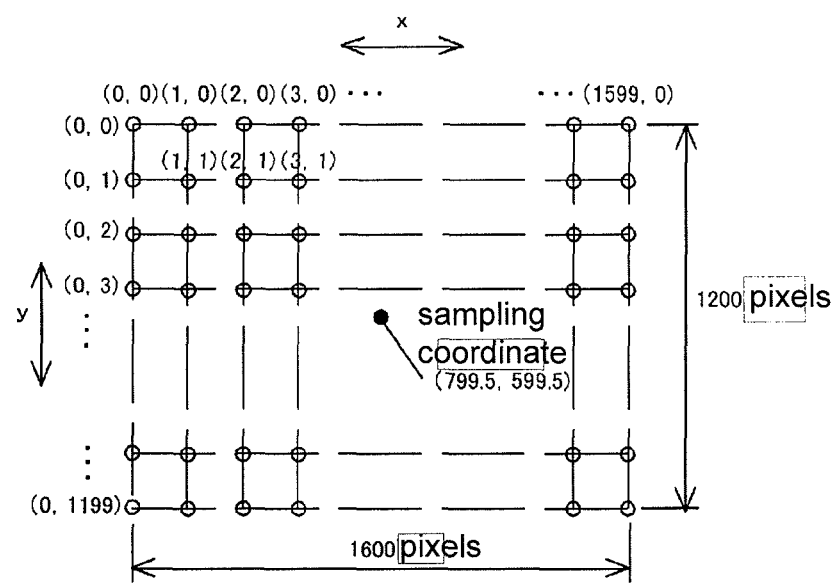
FIG. 3 illustrates a coordinate system used in the example.
Figure 4:
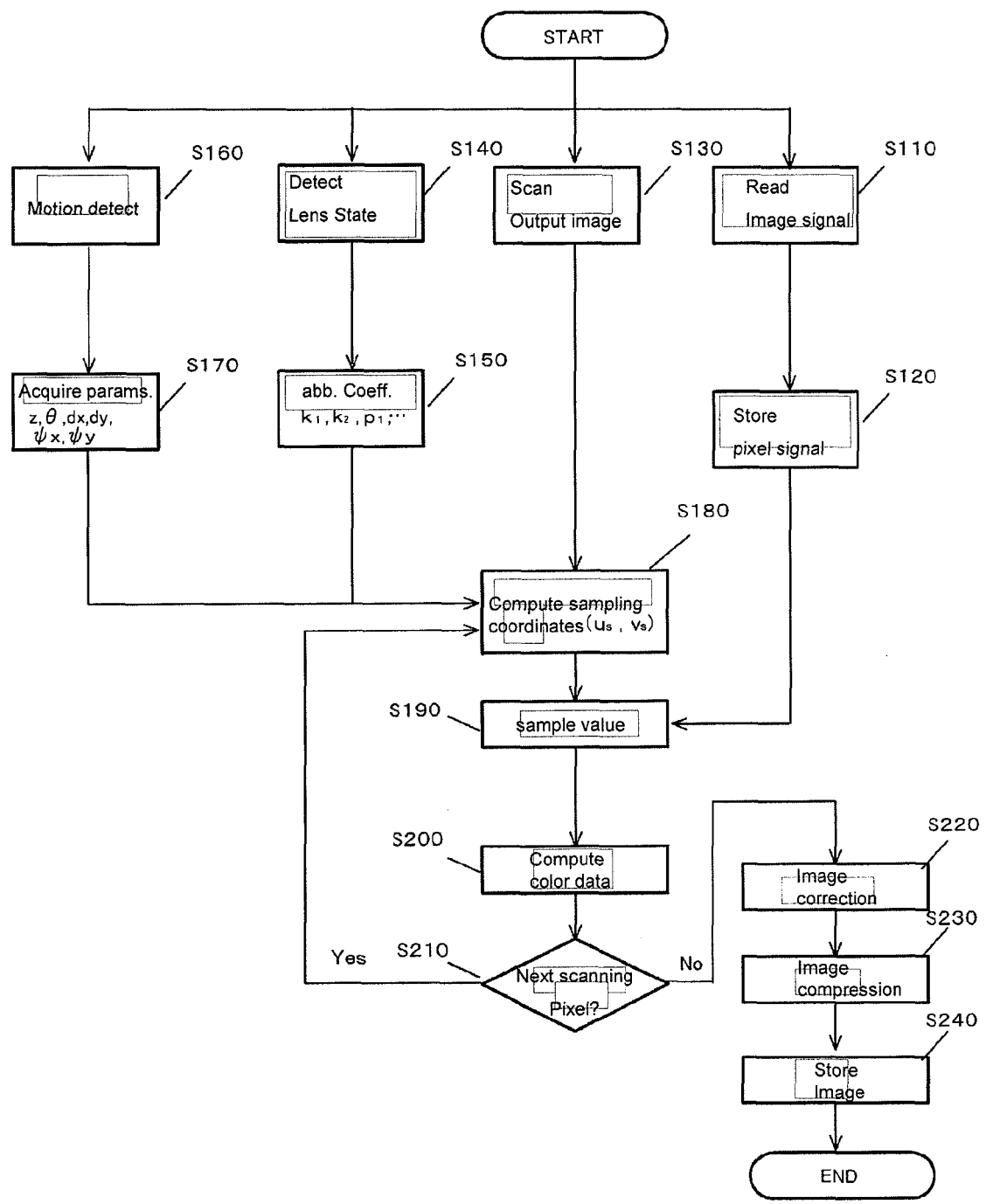
FIG. 4 is a flow chart showing the color image generation procedure.

FIG. 3 is an explanatory view of the coordinate system in the present embodiment and FIG. 4 shows the color image generation method used for image processing and the image processing program of the embodiment.

The imaging device 1 shown in FIG. 1 is a camera module carried, for example in mobile computing devices, such as a cellular phone. The imaging unit 2 projects the object image P to the image sensor 5, and outputs a digital image signal C (which is an image signal of mosaic shape). Based on digital image signal C output via the imaging unit 2, motion correction and the predetermined image deformation correction of the imaging unit 2 to a photographic subject are performed by the image processing device 100. This generates the color image provided with two or more color data for every pixel.

The imaging unit 2 has an imaging lens 3 which projects the object image P to the image sensor 5, and the image sensor converts the received light into a quantity of electricity. The analog image signal output by the image sensor (CCD: Charge Coupled Devices) 5 is converted into digital image signal C by an AFE (Analog Front End) 6. A timing generator TG (Timing Generator) 13 controls the image sensor 5 and the AFE by specific cycles. The lens actuator 12 is arranged to perform a sliding motion of the imaging lens 3 along the optical axis direction (Z direction), and detection unit 10 detects, via sensor 11, the imaging lens 3 slide amount. Angular velocity sensor 15 outputs an electrical signal according to the amount of motion.

The imaging unit 2 allows the imaging lens 3 to slide along an optical axis via the lens actuator 12. The lens is a zoom lens having a so-called focus adjustment mechanism that allows to vary the lens state, such as a focal distance of the imaging lens 3 and object distance from the imaging lens 3 to a photographic subject.

The image sensor 5 is a single chip type image sensor having a plurality of optoelectric transducers arranged in a matrix. It has a light filter 5a which matches with the front face of the optoelectric transducers, and that comprises a Bayer arrangement of the three primary colors R (red), G (green) and B (blue). It is constituted so that the light volume of the single color which passes the filter module of each color may be converted into an electrical signal.

As shown for the primary color Bayer array in FIG. 2 (a), the color filters are arranged in a checker board pattern, wherein the G colored filter and the R colored filter are arranged in an alternating sequence. Likewise the G colored filter and the B colored filter are arranged in an alternating sequence. In FIG. 2 (a), the G color arranged along with R in one direction is denoted in this example as Gr, and the G color arranged along with B in this direction is indicated as Gb.

AFE6 comprises amongst others a CDS 7 (correlation double sampling unit) which removes noise from the analog image signal output by the image sensor 5. AFE6 further comprises a variable gain amplifier (AGC:Automatic Gain Control) which amplifies the image signal for which the correlation double sampling was carried out in the correlation double sampling circuit (CDS:Corelated Double Sampling). AFE6 further comprises an A/D converter 9 which converts the analog image signal inputted by Gain Control 8 into a digital image signal. Therewith the image signal output by the image sensor 5 is converted into digital image signal C that is output to the image processing device 100.

In the imaging unit 2, instead of the image sensor 5, a CMOS (Complementary Metal Oxide Semiconductor) sensor may be used in combination with the correlation double sampling circuit 7, the variable gain amplifier 8, and A/D-converter. Since the signal for every pixel output by the image sensor 5 has only information for a single color, a mosaic image signal is output to the image processing device 100 by the imaging unit 2.

The angular velocity sensor 15 is for example constituted by a publicly known vibration gyroscope. The angular velocity sensor generates an electrical signal (henceforth the motion signal) that is representative for a motion of the imaging unit 2 relative to the photographic subject concerned, resulting in motion in a cross direction, motion in a longitudinal direction, motion in a sliding direction, rotation motion with the axis of rotation in a cross direction, rotation motion with the axis of rotation in a longitudinal direction, and rotation motion with the axis of rotation in a sliding direction. The motion signal is output to the image processing device. Instead of the angular velocity sensor 15, 3 axial-piezoelectric acceleration sensors arranged according to three mutually perpendicular directions may be used. Instead of detecting motion by the above-mentioned sensor, the image processing device 100 may detect the difference of the image signal between two or more images taken a predetermined time after each other and motion may be detected based on this difference.

The imaging unit 2 outputs the mosaic image to the image processing device 100. The color plane decomposition module 21 separately stores R, Gr, Gb and B pixel information from which the color image to output is scanned. Coordinates for the processing-object pixel T are generated one by one by the pixel scanning section 25.

The aberration distortion coefficient for matching with the lens state of the pixel scanning section 25 is set up one by one for correcting the aberration distortion of the imaging unit 2. To that end the lens state detecting element 37 detects the lens state of the imaging lenses 3, such as a focal distance and distance with a photographic subject, and the imaging lens 3, and the aberration coefficient calculation module 39 sets up the correction parameter for the aberration distortion based on the recorded information from the aberration coefficient table 38, and the lens state detected by the lens state detecting element 37, and the aberration coefficient table 38, and the motion signal output from the angular velocity sensor 15. The image processing device further has a motion detecting module 40 which computes a motion correction value for the color mosaic image inputted from the imaging unit 2.

The signal with which the image processing device 100 indicates the position of the processing-object pixel T is output by the pixel scanning section 25. Based on this signal and the signals output by the motion detecting module 40 and the aberration coefficient calculation module 39, the sampling-coordinates calculation module 29 can set up the sampling coordinates for every color of R, G and B. The image processing device further has color generation module 33 which generates the color data which composes the pixel value for every color plane of R, Gr, Gb, and B which were obtained via the sampling section 32 that samples the pixel value for every color plane of B, R, Gr, Gb.

The image processing device 100 shown comprises a vision correction module 34 for gamma correction and saturation correction, edge enhancement etc, publicly known to improve appearance of the color image output by the color generation module 33. The color image output via the vision correction module 34 is compressed by a method, such as JPEG in the compression module 35. The storage unit 36 stores the compressed data in a recording medium, such as a flash memory. CPU 18 controls each processing of the imaging device 1 and the image processing device 100 concerned according to the program for control stored in ROM 19.

The color plane decomposition module 2 matches with the Bayer array and it has an R field memory 22 that memorizes the R pixel signal, a Gr field memory 23*a* that memorizes the Gr pixel signal, the Gb field memory 23*b* that memorizes the Gb pixel signal as well as a B field memory 24 that memorizes the B pixel signal. These pixel signals (henceforth a pixel value) are output to the sampling section 32 based on the instructions from CPU 18.

Based on the electrical signal output by the angle sensor 15, the motion detecting module 40 detects a motion of the imaging unit 2 relative to a photographic subject, and outputs the motion correction parameters (z, dx, dy, θ, ψy, ψx, etc.) for motion correction to the sampling-coordinates calculation module 29.

The motion correction parameter (henceforth also denoted as the motion correction value) for the photographic subject comprise a correction value z for the size of the object image accompanying motion of the cross direction of the imaging unit 2, a correction value dx for the horizontal position of the object image accompanying motion of a longitudinal direction or a yaw axis, a correction value dy for the vertical position of the object image accompanying motion of a sliding direction or a pitch axis. The correction values for rotation of the object image are θ for motion having the axis of rotation in a cross direction, a correction value ψy for the deviations of the sliding direction of the object image accompanying motion of a sliding direction or a pitch axis, and the correction value ψx for the deviations of the longitudinal direction of the object image accompanying motion of a longitudinal direction or a yaw axis. The zoom magnifying power of a digital zoom may be included in motion correction parameter z.

Next, the sampling-coordinates calculation module 29 calculates the coordinates in the color mosaic image corresponding to the position of the processing-object pixel T of the color image output from the pixel scanning section 25 based on the motion correction value generated in the motion detecting module 40.

The coordinate system matching the pixel position is indicated with uv coordinates, and a coordinate system used for compensation calculations is indicated with xy coordinates. Subscript s shows the coordinates in the color mosaic image, and subscript d shows the coordinates in the output color image.

As shown in FIG. 3, as a coordinate system of an output color image, the greatest image height is set to 1, a screen longitudinal direction is set to x by defining an image center as the origin, and a screen sliding direction is set to y. By way of example in a color image, 1200 pixels are arranged in 1600 columns in the longitudinal direction, at equal intervals in the sliding direction.

In the uv coordinate system, (0, 0) indicates the upper left position. Pixels rightward from the upper-left are assigned pixel coordinates (u, v) (1, 0), (2, 0),—(3, 0) (1599, 0). The following line is assigned coordinates (0,1), (1, 1), (2, 1), and—(3, 1) (1599, 1). The coordinates ($u_d$, $v_d$) of the processing-object pixel T are converted into xy coordinates ($x_d$, $y_d$) by formula 1.

[Equation 1]

$$\begin{pmatrix} x_d \\ y_d \end{pmatrix} = \begin{pmatrix} 0.001 & 0 & -0.7995 \\ 0 & 0.001 & -0.5995 \end{pmatrix} \begin{pmatrix} u_d \\ v_d \\ 1 \end{pmatrix} \quad \text{(formula 1)}$$

Next, a parameter (z, θ, dx, dy, ψx, ψy) of the above-mentioned motion correction is applied, and coordinates ($x_s$, $y_s$) after the motion correction are computed by formula 2. Therein $x_s = wx_s/w$ and $y_s = wy_s/w$.

[Equation 2]

$$\begin{pmatrix} wx_s \\ wy_s \\ w \end{pmatrix} = \begin{pmatrix} z\cos\theta & z\sin\theta & dx \\ -z\sin\theta & z\cos\theta & dy \\ \psi x & \psi y & 1 \end{pmatrix} \begin{pmatrix} x_d \\ y_d \\ 1 \end{pmatrix} \quad \text{(formula 2)}$$

Under the present circumstances, the motion detecting module 40 may output the transformation matrix containing this motion correction parameter (formula 2) itself to the sampling-coordinates calculation module 29 instead of outputting motion correction parameters (z, dx, dy, θ, ψy, ψx, etc.) to the sampling-coordinates calculation module 29. And the sampling-coordinates calculation module 29 should just compute the coordinates ($x_s$, $y_s$) after the motion correction by applying this transformation matrix.

To compensate motion, sampling-coordinates $x_{sG}$, $y_{sG}$ in the G plane, provided by the color plane decomposition unit 21, are calculated as follows, using the aberration distortion compensation coefficients $k_1$, $k_2$, $p_1$, and $p_2$ $$x_{sG} = x'(1 + k_1 r'^2 + k_2 r'^4) + 2p_1 x' y' + p_2 (r'^2 + 2x'^2)$$

$$y_{sG} = y'(1 + k_1 r'^2 + k_2 r'^4) + 2p_1 x' y' + p_2 (r'^2 + 2y'^2)$$

Therein $r'^2 = x'^2 + y'^2$ $k_1$, $k_2$, $p_1$, and $p_2$ are coefficients indicative for an aberration distortion of the imaging lens 3. $k_1$ and $k_2$ are indicative for the distortion in the radial direction, and $p_1$ and $p_2$ are indicative for the distortion in a tangential direction.

Taking into account chromatic aberration of the imaging lens 3, sampling coordinates ($x_{sR}$, $y_{sR}$) ($x_{sB}$, $y_{sB}$) in R plane and B plane are computed by formula 3 and formula 4.

[Equation 3]

$$\begin{pmatrix} x_{sR} \\ y_{sR} \end{pmatrix} = \begin{pmatrix} k_R & 0 & dRx \\ 0 & k_R & dRy \end{pmatrix} \begin{pmatrix} x_{sG} \\ y_{sG} \\ 1 \end{pmatrix} \quad \text{(formula 3)}$$

$$\begin{pmatrix} x_{sB} \\ y_{sB} \end{pmatrix} = \begin{pmatrix} k_B & 0 & dBx \\ 0 & k_B & dBy \end{pmatrix} \begin{pmatrix} x_{sG} \\ y_{sG} \\ 1 \end{pmatrix} \quad \text{(formula 4)}$$

Here $k_R$, $d_{Rx}$, $d_{Ry}$, $k_B$, $d_{Bx}$ and $d_{By}$ are coefficients indicative for a color aberration of the imaging optical system 2A.

$k_R$ and $k_B$ are the ratios between the magnification of the R and the B plane, and the magnification of the G plane respectively, $d_{Rx}$, and $d_{Ry}$, represent the parallel misalignment of the R plane relative to the G plane in the x-direction and the y-direction respectively, $d_{Bx}$, and $d_{By}$ represent the parallel misalignment of the B plane relative to the G plane in the x-direction and the y-direction respectively.

Next, consider a color mosaic image also in a pixel arrangement having 1600 pixels in a longitudinal direction, by 1200 pixels in the sliding direction and at equal intervals. Supposing the pixel number ($u_s$, $v_s$) is assigned like the output image (color image), then the sampling coordinates ($u_{sR}$, $v_{sR}$), ($u_{sG}$, $v_{sG}$), and ($u_{sB}$, $v_{sB}$) on the input image corresponding to ($x_{sR}$, $y_{sR}$), ($x_{sG}$, $y_{sG}$), ($x_{sB}$, $y_{sB}$) are computed by formulas 5, 6 and 7.

[Equation 4]

$$\begin{pmatrix} u_{sR} \\ v_{sR} \end{pmatrix} = \begin{pmatrix} 1000 & 0 & 799.5 \\ 0 & 1000 & 599.5 \end{pmatrix} \begin{pmatrix} x_{sR} \\ y_{sR} \\ 1 \end{pmatrix} \quad \text{(formula 5)}$$

$$\begin{pmatrix} u_{sG} \\ v_{sG} \end{pmatrix} = \begin{pmatrix} 1000 & 0 & 799.5 \\ 0 & 1000 & 599.5 \end{pmatrix} \begin{pmatrix} x_{sG} \\ y_{sG} \\ 1 \end{pmatrix} \quad \text{(formula 6)}$$

$$\begin{pmatrix} u_{sB} \\ v_{sB} \end{pmatrix} = \begin{pmatrix} 1000 & 0 & 799.5 \\ 0 & 1000 & 599.5 \end{pmatrix} \begin{pmatrix} x_{sB} \\ y_{sB} \\ 1 \end{pmatrix} \quad \text{(formula 7)}$$

The value of the sampling coordinates ($u_{sR}$, $v_{sR}$) ($u_{sG}$, $v_{sG}$), and ($u_{sB}$, $v_{sB}$) computed in the sampling-coordinates calculation module 29 generally are nonintegral.

Next, as illustrated in FIG. 2, the sampling section 32 computes and outputs the sampling value in the sampling coordinates computed by the sampling-coordinates calculation module 29 from each color plane (R plane, Gr plane, Gb plane, B plane) generated by the color plane decomposition module 21.

From the R plane the value at coordinates ($u_{sR}$, $v_{sR}$), is output, from the Gr plane the value at coordinates ($u_{sG}$, $v_{sG}$) is output. From the Gb plane, the value at coordinates ($u_{sG}$, $v_{sG}$) is output, and from the B plane the value at ($u_{sB}$, $v_{sB}$) is output. The sampling value Rs, Grs, Gbs, and Bs in the processing-object pixel T ($u_d$, $v_d$) in the output image (color image) are obtained.

Under the present circumstances, as mentioned above, since the coordinates are not necessarily integer, a sampling position ($u_s$, $v_s$) computes a sampling value by performing linear interpolation using the values of four pixels surrounding ($u_s$, $v_s$).

The R plane, Gr plane, Gb plane, and the B plane each have four neighbor pixels in every direction of a lattice point as shown in FIG. 2. Four neighbor pixels surround the sampling coordinates 401, 402, 403, and 404. If the sampling-coordinates $u_{sR}$ concerned is (100.8,101.4), the four pixels (u, v) surrounding this will be set to (100,100), (100,102), (102, 100), and (102,102).

A distance ratio between neighboring pixels is as shown in FIG. 2(f) (here) 0.4:0.6 in a x direction and 0.7:0.3 in a y direction. A pixel value of R in a sampling position (101.8, 101.4) is computed with interpolation using a pixel value of four neighbor pixels.

For example, if a pixel value R of a sampling position (100.8.0,101.4) is denoted with R (100.8,101.4) and the pixel values of its four neighbor pixels in the R plane are denoted with R (100,100), R (100,102), R (102,100), and R (102,102) then the pixel value R (100.8,101.4) of the sampling coordinates 401 on R plane is computable with a computing equation:

$R(100.8,101.4)=0.6*0.3*R(100,100)+0.6*0.7*R(100,102)+0.4*0.3*R(102,100)+0.4*0.7*R(102,102)$

A pixel value of the sampling coordinates 402, 403, and 404 in the Gr, Gb, and B plane is also computable with interpolation from a pixel value of four neighbor pixels surrounding the sampling coordinates in the same way as for the R plane. In the sampling section, a sampling value of R, Gr, Gb, and B is computed for all pixels in the output image.

Next, the color generation module 33 generates color data (RGB component) for every pixel from the sampling value Rs, Grs, Gbs, and Bs for every color plane obtained by the sampling section 32, and generates an output image (color image).

Under the present circumstances, for example, Rs can be used for the R component of color information and Bs for the B component and an average of Grs and Gbs for the G-component. A further false color control may be performed at this step. It is noted that false red and blue colors may easily appear in a monochrome striped pattern near the Nyquist rate. These striped patterns can be detected by detecting a difference of Gr and Gb in a color image sensor of a Bayer array constituted by the image sensor 5, and can be used for controlling false color.

Next, image corrections, such as tone curve (gamma) correction, chroma saturation emphasis, and edge enhancement, are performed in the vision correction module 34. Then, the digital image signal may be compressed by the compression module 35 using a digital image signal compression method for color images, such as JPEG (Joint Photographic Experts Group), and subsequently stored in a recording medium by storage unit 36.

Next, with reference to FIG. 4, a procedure is explained for correcting motion distortion and aberration distortion of a color mosaic image (input image) inputted via the imaging unit 2, and for generating a color image (output image). Based on a program stored in ROM 19, CPU 18 gives a command signal to each functional module, to perform this procedure. S in FIG. 4 indicates a step.

First, this procedure is started when a start signal is provided to the image processing device 100 by an operator.

Subsequently, in S110, an image signal is read into the image processing device 100 via the imaging unit 2, and by the color plane decomposition module 21. The latter matches with a Bayer array, and in step S120 stores a pixel signal of R, a pixel signal of Gr, a pixel signal of Gb, and a pixel signal of B. Subsequently the procedure continues with a sampling step S190.

In S130, using the output-image-elements scanning section 25, an output image (color image) is scanned, a processing-object pixel is acquired one by one. This step is succeeded by S180.

In S140 the lens state is detected that matches with a focal distance or object distance using the lens state detecting element 37. Subsequently in S150 aberration coefficients ($k_1$, $k_2$, $p_i$—) matching the lens state are acquired from the aberration coefficient table 38. Control flow then continues with S180.

In S160, using the angular velocity sensor 15 and the motion detecting module 40, the amount of motion of the imaging device 1A is detected. Then in S170 parameters (z, θ, dx, dy, ψx, ψy) for the required correction of motion are acquired by S170, and control flow continues with S180.

Subsequently, in S180, an aberration coefficient acquired by S150, the motion correction parameters acquired by S170, etc. are used to compute sampling coordinates ($u_s$, $v_s$) in an input image (color mosaic image) corresponding to a processing-object pixel position of an output image (color image) acquired by S130, and control flow continues to S190.

Subsequently, in S190, using the sampling section 32 from each color plane generated by the color plane decomposition module 21 a sampling value, i.e. a pixel value R, Gr, Gb, and B in the sampling coordinates ($u_s$, $v_s$) computed by the sampling-coordinates calculation module 29, is computed, and control flow then continues with S200.

Subsequently, in S200, by composing the sampling values with the color generation module 33, for each color computed by the sampling section 32, color data for a plurality of colors is generated for a processing-object pixel. Control flow then continues with S210.

Subsequently it is determined in step S210 whether a following scanning pixel is present in the output image. If it is determined that there is a further scanning pixel (Yes) then S180-S210 are repeated. If it is determined that there is no further scanning pixel (No), control flow continues with S220.

Subsequently, in S220, using the vision correction module 34, image corrections, such as tone curve (gamma) correction, chroma saturation emphasis, and edge enhancement, are performed to the color image generated by the color generation module 33, and it moves to S230 after that in S220.

Subsequently, in S230, a digital image signal of a color image output via the vision correction module 34 is compressed by a method as JPEG (Joint Photographic Experts Group), using the compression module 35. Therewith the size of the image data to be stored is reduced. Control flow then continues with S240.

Subsequently, in S240, a compressed digital image signal is stored in a storage medium, such as a flash memory, using the storage unit 36, after which this image processing program is ended.

As described with reference to the example above, in the image processing device 100, the image processing method, and the image processing program given in this example, the aberration coefficient calculation module 39 determines an aberration coefficient for correction of aberration distortion and by, and a motion detecting module 40 determines a parameter for correction of motion distortion. By applying the correction for motion distortion and aberration distortion both in the demozaic process, image processing is simplified as compared to a method wherein this is preformed downstream as an independent process. In addition a color image having a good resolution can be obtained.

As mentioned above, although one example of this invention was described, this invention is not limited to said example and can be carried out in various ways. In the imaging device 1, for example, the imaging lens 3, the lens actuator 12, and the detecting element 10 may be carried out as a detachable lens unit. The lens unit may be equipped with the aberration coefficient table 38, the aberration coefficient calculation module 39, and angular velocity sensor 15.

The invention claimed is:

1. An image processing device for processing an image obtained by an imaging unit having an image sensor which has two or more types of photo detectors for different colors, the image processing device generating a color image having brightness information of a plurality of colors for each pixel using a color mosaic image having monochromatic brightness information for each pixel obtained from the imaging unit, the image processing device performing an image transformation, and wherein the image processing device comprises:

a color plane decomposition module that disassembles said color mosaic image into two or more color planes, each of the color planes including only brightness information for one color;

a motion detecting module that generates a motion correction value to compensate a relative motion between a photographic subject and an imaging unit for each pixel coordinate in said color mosaic image;

a sampling-coordinates calculation module that calculates sampling coordinates in said color mosaic image by applying a coordinate transformation to respective pixel positions of said color image wherein said image transformation is performed for the pixel position of said color image using said motion correction value in said coordinate transformation;

a sampling module that calculates the pixel values at said sampling coordinates by interpolating pixel values in said color planes for each of the two or more color planes decomposed by said color plane decomposition module; and a color generation module that composes pixel values interpolated by said sampling module at sampling coordinates of each color plane, and generates a pixel signal of said color image.

2. The image processing device according to claim 1, wherein the motion detecting module generates the motion correction value for at least one of the set of motions consisting of: motion in a cross direction, motion in a longitudinal direction, motion in a sliding direction, rotation motion having an axis of rotation in a cross direction, rotation motion having an axis of rotation in a longitudinal direction, and rotation motion having an axis of rotation in a sliding direction toward a photographic subject.

3. The image processing device according to claim 1, wherein the sampling-coordinates calculation module sets up said sampling coordinates at the time of performing an image deformation correction using a parameter indicative of said image deformation.

4. The image processing device according to claim 3 wherein the parameter indicative of said image deformation is a parameter for correction of at least one of the set consisting of: a parallel translation, scaling, roll, and yaw and pitch of an object image which was formed at said image sensor.

5. The image processing device according to claim 1 wherein a parameter of image deformation indicates a correction of an aberration distortion resulting from an imaging unit, said parameter of image deformation being used in said coordinate transformation in addition to said motion correction value.

6. An image processing method wherein an image is obtained by an imaging unit having an image sensor which carries out a photoelectric conversion of light of two or more different colors and wherein the image processing method generates a color image having brightness information of a plurality of colors for each pixel using a color mosaic image that has monochromatic brightness information obtained from the imaging unit, the image processing method performing an image transformation, and wherein the method comprises the following steps:

disassembling, during a color plane decomposition step, said color mosaic image into two or more color planes, each of the color planes including only brightness information for one color;

computing, during a motion detecting step, a motion correction value to compensate a relative motion between a photographic subject and said imaging unit for each pixel coordinate in said color mosaic image;

calculating, during a sampling-coordinates calculation step, sampling coordinates in said color mosaic image by applying a coordinate transformation to respective pixel positions of said color image, wherein said image transformation is performed for the pixel position of said color image using said motion correction value in said coordinate transformation;

interpolating, during a sampling step, pixel values at said sampling coordinates from pixel values of a same color contained in said color plane for each of two or more color planes decomposed during said color plane decomposition step; and composing, during a color generation step, pixel values that were interpolated during said sampling step for each color plane at the sampling coordinates, and wherein the color generation step includes generating a pixel signal of said color image.

7. The image processing method according to claim 6 wherein said motion detecting step generates the correction value for at least one of the set of motions consisting of: motion in a cross direction, motion in a longitudinal direction, motion in a sliding direction, rotation motion having an axis of rotation in a cross direction, rotation motion having an axis of rotation in a longitudinal direction, and rotation motion having an axis of rotation in a sliding direction toward a photographic subject.

8. The image processing method according to claim 6 wherein said sampling-coordinates calculation step sets up said sampling coordinates at the time of performing an image deformation correction using a parameter indicative of said image deformation.

9. The image processing method according to claim 8 wherein the parameter indicative of said image deformation is a parameter for correction of at least one of the set consisting of: a parallel translation, scaling, roll, and yaw and pitch of an object image which was formed at said image sensor.

10. The image processing method according to claim 6 wherein a parameter of image deformation indicates a correction of an aberration distortion resulting from an imaging unit, said parameter of image deformation being used in said coordinate transformation in addition to said motion correction value.

11. A non-transitory computer-readable medium comprising a stored image processing program including computer-executable instructions to be performed by a computer to perform an image processing method wherein each pixel of the image is obtained by an imaging unit having an image sensor which carries out a photoelectric conversion of light of two or more different colors and wherein the image processing method generates a color image having brightness information of a plurality of colors for each pixel using a color mosaic image that has monochromatic brightness information obtained from the imaging unit, the image processing method performing an image transformation, and wherein the method comprises the following steps:

disassembling, during a color plane decomposition step, said color mosaic image into two or more color planes, each of the color planes including only brightness information for one color;

computing, during a motion detecting step, a motion correction value to compensate a relative motion between a photographic subject and said imaging unit for each pixel coordinate in said color mosaic image;

calculating, during a sampling-coordinates calculation step, sampling coordinates in said color mosaic image by applying a coordinate transformation to respective pixel positions of said color image, wherein said image transformation is performed for the pixel position of said color image using said motion correction value in said coordinate transformation;

interpolating, during a sampling step, pixel values at said sampling coordinates from a pixel value of a same color contained in said color plane for each of two or more color planes decomposed during said color plane decomposition step; and composing, during a color generation step, pixel values that were interpolated during said sampling step for each color plane at the sampling coordinates, and wherein the color generation step includes generating a pixel signal of said color image.

12. The non-transitory computer readable medium including the image processing program according to claim 11 wherein said motion detecting step generates the correction value for correcting at least one of the set of motions consisting of: motion in a cross direction, motion in a longitudinal direction, motion in a sliding direction, rotation motion having an axis of rotation in a cross direction, rotation motion having an axis of rotation in a longitudinal direction, and rotation motion having an axis of rotation in a sliding direction toward a photographic subject.

13. The non-transitory computer readable medium including the image processing program according to claim 11 wherein said sampling-coordinates calculation step sets up said sampling coordinates at the time of performing an image deformation correction using a parameter indicative of said image deformation.

14. The non-transitory computer readable medium including the image processing program according to claim 13 wherein the parameter indicative of said image deformation is a parameter for correction of at least one of the set consisting of: a parallel translation, scaling, roll, yaw and pitch of an object image which was formed at said image sensor.

15. The non-transitory computer readable medium including the image processing program according to claim 11 wherein a parameter of image deformation indicates a correction of an aberration distortion resulting from an imaging unit, said parameter of image deformation being used in said coordinate transformation in addition to said motion correction value.

\* \* \* \* \*